Aug. 14, 1956  J. W. CASE  2,758,951
GLASS-REINFORCED PLASTIC ARTICLE
Filed July 23, 1953

INVENTOR
JAMES W. CASE
BY
ATTORNEYS

United States Patent Office 2,758,951
Patented Aug. 14, 1956

2,758,951

GLASS-REINFORCED PLASTIC ARTICLE

James W. Case, Fairfax, Va.

Application July 23, 1953, Serial No. 369,974

4 Claims. (Cl. 154—43)

(Granted under Title 35, U. S. Code (1952), sec. 266)

The invention described herein may be manufactured and used by or for the Government of the United States of America for governmental purposes without the payment of any royalties thereon or therefor.

This invention relates to plastic products, and to methods for the manufacture of plastic products.

More particularly, the invention concerns a molded plastic material formed by arranging a plurality of coated glass fibers in parallel relationship, and in one or more layers united with organic bonding material to produce a unitary, glass-reinforced plastic sheet or panel.

My copending application No. 338,924, filed February 25, 1953, discloses and claims a method and apparatus for coating such glass fibers as they emerge from a glass furnace. The present application is directed to the arrangement of the fibers, the relationships therebetween, and the manner in which such arrangement and relationships impart strength, toughness, durability, and a higher glass content for a given thickness of product.

An object of the invention is to provide a process for the manufacture of plastic board, or plastic laminate, in which a novel step comprises the method of arranging and interrelating the reinforcing glass fibers incorporated in the product.

A second object of the invention is to provide a plastic product having incorporated therein a plurality of reinforcing glass fibers of varying thicknesses, so arranged in relation one to another, that the fibers of smaller thickness are interposed between adjacent fibers of greater thickness but in offset disposition with respect to lines joining said adjacent fibers at their central axes.

A third object is to provide a plastic product incorporating a plurality of glass cylinders of reinforcing material, the cylinders being of varying cross-sectional area and so interrelated as to produce maximum glass content within the confines of the finished product.

A fourth object is to provide a process for the manufacture of plastic board, or plastic laminate, which process involves drawing from a glass furnace successive series of molten glass fibers of varying cross-sectional areas, winding said successive series of fibers upon a receiving drum, until the number of wound layers produces a desired thickness of glass upon the drum, then removing all of the glass from the drum by a longitudinal cut through all the layers, to permit the wound glass layers to be laid out on a plane surface, in the form of a mat, and finally applying to said glass mat a quantity of liquid filler material sufficient to unite the glass fibers into a single plastic entity by the penetration of the liquid filler into all of the spaces between successive fibers.

Other objects and many of the attendant advantages of this invention will be readily appreciated as the same becomes better understood by reference to the following detailed description when considered in connection with the accompanying drawings wherein.

Figure 1:
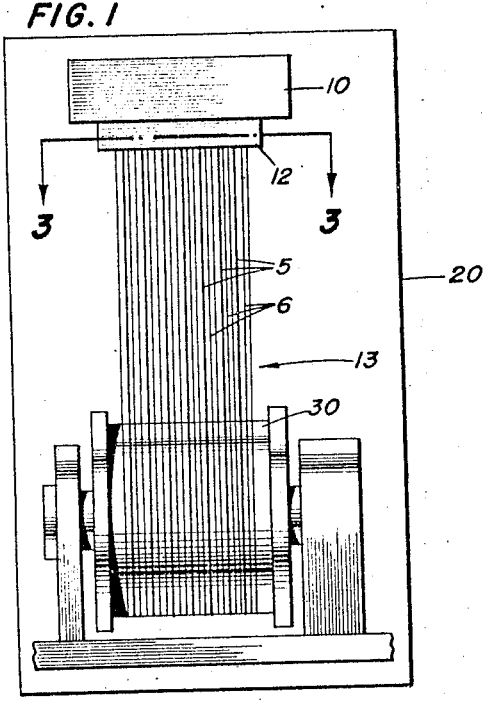
Figs. 1 and 2 are front and end elevation views, respectively, of apparatus applicable to the practice of the invention.
Figure 2:
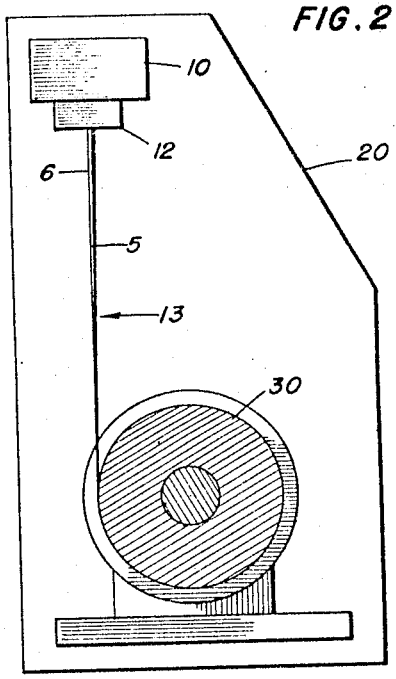
Figure 3:
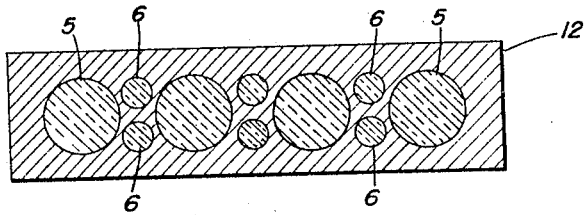
Fig. 3 is a plan view of the furnace bushing of Figs. 1 and 2, the orifice diameters being shown on a greatly magnified scale.

In Figs. 1 and 2 numeral 10 denotes a glass furnace containing molten glass. The glass is drawn as filaments 13 from a bushing 12 whose details are better shown in Fig. 3. Referring to said Fig. 3 the bushing is there shown as provided with a series of relatively large aligned orifices 5 and a series of smaller orifices 6 in staggered and interstitial relation to the orifices 5, but in sufficiently close proximity to maintain all orifices within the limits of a straight line having tangency with the larger orifices 5, so that the glass fibers 13 drawn through these orifices will all be disposed in a single array and therefore will lie smoothly and evenly upon the cylindrical surface of the drum 30 (Figs. 1 and 2) after passing through the coating chamber 20 where they receive a coating of metal or other bond tolerating material, for example, the coating material may comprise any of the polymeric synthetic resins such as the polyesters, phenolics, epoxies, and silicones; and metals such as copper, iron, and nickel. The drum is motor driven in a manner well-known in the art. When the winding process has continued long enough to produce the desired number of layers of glass fibers upon the drum's surface, the drum's rotation is interrupted and the glass mat is removed therefrom by a longitudinal slitting operation, with the cutting instrument penetrating all layers. The process is repeated to form additional glass mats, after which the desired number of mats are superimposed and integrated with liquid filler material containing a resinous binder and suitable plasticizing agents whereby the superimposed glass mats are converted into a unitary, glass-reinforced plastic board, or laminate, after the plastic binder material has had time to acquire a permanent set. In assembling successive mats to form the complete laminated board, the mats may be turned selectively to establish different angular relationships between the parallel fibers of one mat, and those of the mats immediately above and below. In this manner the strength of the completed board will be increased, and will approach uniformity of strength and resistance to bending or breaking forces applied thereto from any direction. Also, if desired, the successive glass-filled laminate may be interleaved with laminae of other compositions, such as plastic sheets having other kinds of reinforcing fabrics, or no reinforcing material whatever, so that in the completed board the glass-filled layers may be in spaced relationship, in a cross section through the board rather than contiguous.

Figure 4:
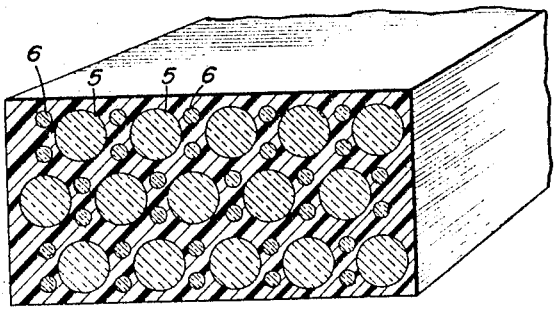
Fig. 4 is a similarly exaggerated sectional view of a plastic unit made by the process herein disclosed, utilizing the apparatus illustrated in Figs. 1, 2 and 3.

As each glass mat includes a plurality of layers of the glass fibers 13, it will be apparent that the drum 30 will make many revolutions before accumulating a sufficient thickness of glass to form one of the mats; and while the mat illustrated in Fig. 4 is shown as having only three such layers it is to be understood that this is a purely schematic illustration, and that actually there may be hundreds of layers of the filament 13 in each individual mat. The actual diameter of even the "relatively large" orifices 5 is on the order of just a few thousandths of an inch, with that of the smaller orifices 6 being correspondingly less.

Obviously many modifications and variations of the present invention are possible in the light of the above teachings. It is therefore to be understood that within the scope of the appended claims the invention may be practiced otherwise than as specifically described.

What is claimed is:

1. A plastic product of rectilinear contour comprising a plurality of layers of glass fibers, each layer including a first series of substantially parallel aligned fibers, a second series of substantially parallel fibers, the cross-sectional area of each of the fibers of the second series being relatively small in comparison to the cross-sectional area of the fibers in the first series, the fibers of said second series being alternately positioned in interstitial relationship to the fibers of the first series, and a plastic medium surrounding all of said layers and filling the spaces therebetween.

2. A plastic product comprising moldable plastic material and a reinforcing core of glass filaments arranged in parallel superimposed rows, each row including a first series of closely spaced parallel aligned filaments, a second series of parallel filaments, the thickness of each of the filaments of the second series being small in comparison with the thickness of the filaments of the first series, the filaments of the second series being positioned between and adjacent the closely spaced filaments of the first series in substantially parallel relationship thereto such that the filaments of the second series are disposed within the boundary of the row as defined by upper and lower planes tangent to the parallel aligned filaments of the first series.

3. A plastic product as defined in claim 2 including a coating of metal on all of said glass filaments.

4. A plastic product as defined in claim 2 including a coating of organic substance on all of said glass filaments.

References Cited in the file of this patent

UNITED STATES PATENTS

| | | |
|---|---|---|
| 2,057,393 | Powell | Oct. 13, 1936 |
| 2,422,969 | Johns | June 24, 1947 |
| 2,564,882 | Cubberley et al. | Aug. 21, 1951 |
| 2,565,941 | Barnard | Aug. 28, 1951 |
| 2,574,221 | Modigliani | Nov. 6, 1951 |
| 2,577,214 | Slayter | Dec. 4, 1951 |
| 2,609,320 | Modigliani | Sept. 2, 1952 |
| 2,699,415 | Nachtman | Jan. 11, 1955 |